United States Patent [19]

Hettinga

[11] 4,397,806

[45] Aug. 9, 1983

[54] METHOD AND APPARATUS FOR MOLD INJECTION

[76] Inventor: Siebolt Hettinga, 800 University Ave., Des Moines, Iowa 50311

[21] Appl. No.: 315,351

[22] Filed: Oct. 26, 1981

[51] Int. Cl.³ .............................. B29F 1/06; B29F 1/08
[52] U.S. Cl. ......................... 264/328.14; 264/328.19; 425/558; 425/561; 425/563
[58] Field of Search ............... 425/558, 559, 561, 563; 264/328.14, 328.19

[56] References Cited

U.S. PATENT DOCUMENTS 3,020,591  2/1962  Breher ........................... 425/558 X Primary Examiner—Thomas P. Pavelko
Attorney, Agent, or Firm—Rudolph L. Lowell

[57] ABSTRACT

The method and apparatus for the injection of an injection material into a mold includes an upright extruder mechanism having an upright feed screw driven from its lower end. Material introduced at the top of the extruder is fed by the screw outwardly of the extruder through an outlet projected laterally outwardly from the extruder at a position adjacent the lower end of the screw. The extruder outlet constitutes a piston receivable with a cylindrical material chamber of an injection nozzle unit. Material is fed in one direction in incremental amounts from the extruder and into the material chamber when the extruder is moved in one direction relative to the injection nozzle unit, and is then forced from the material chamber by the extruder outlet and into the nozzle unit for injection into a mold when the extruder is moved in an opposite direction relative to the nozzle unit.

3 Claims, 10 Drawing Figures

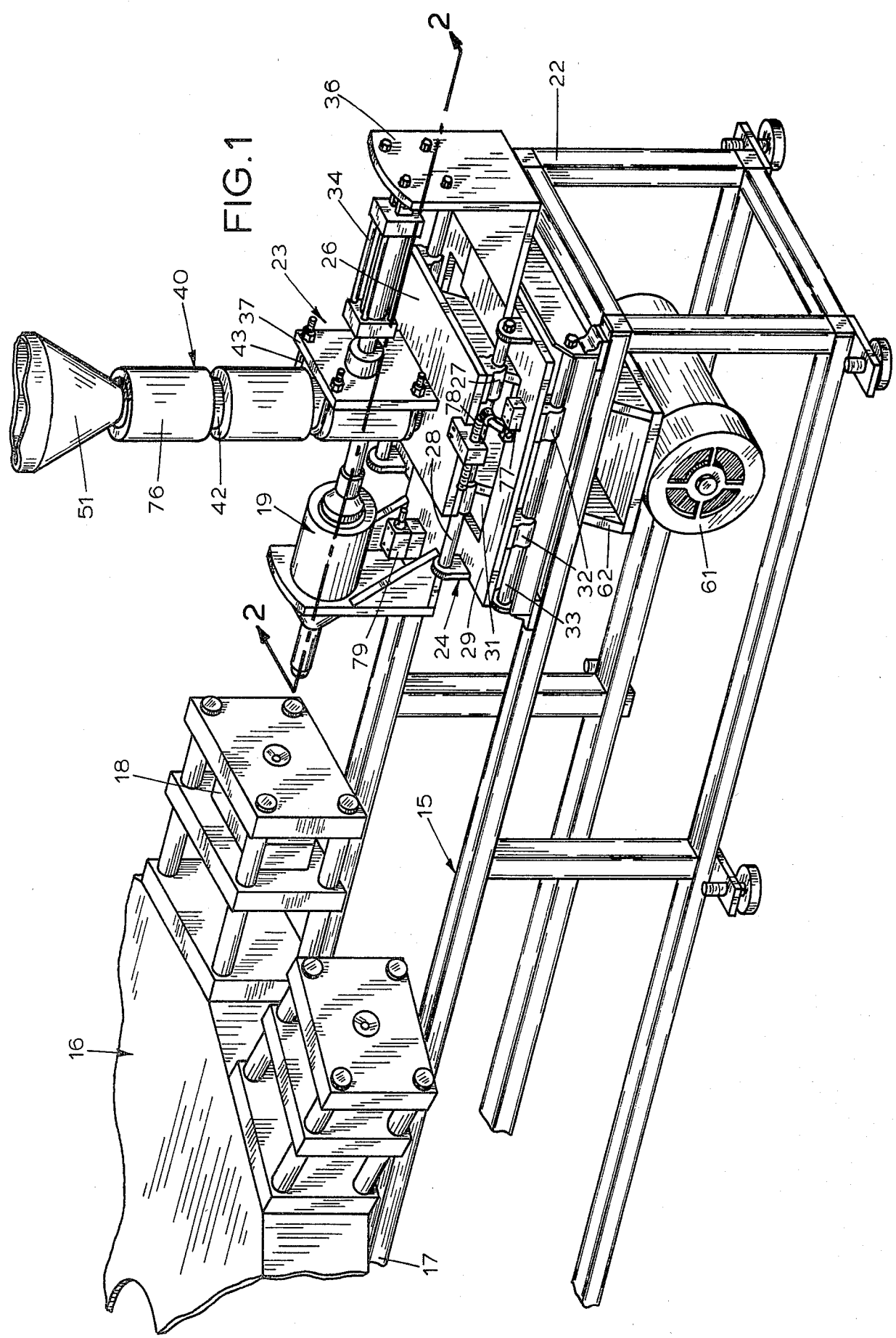

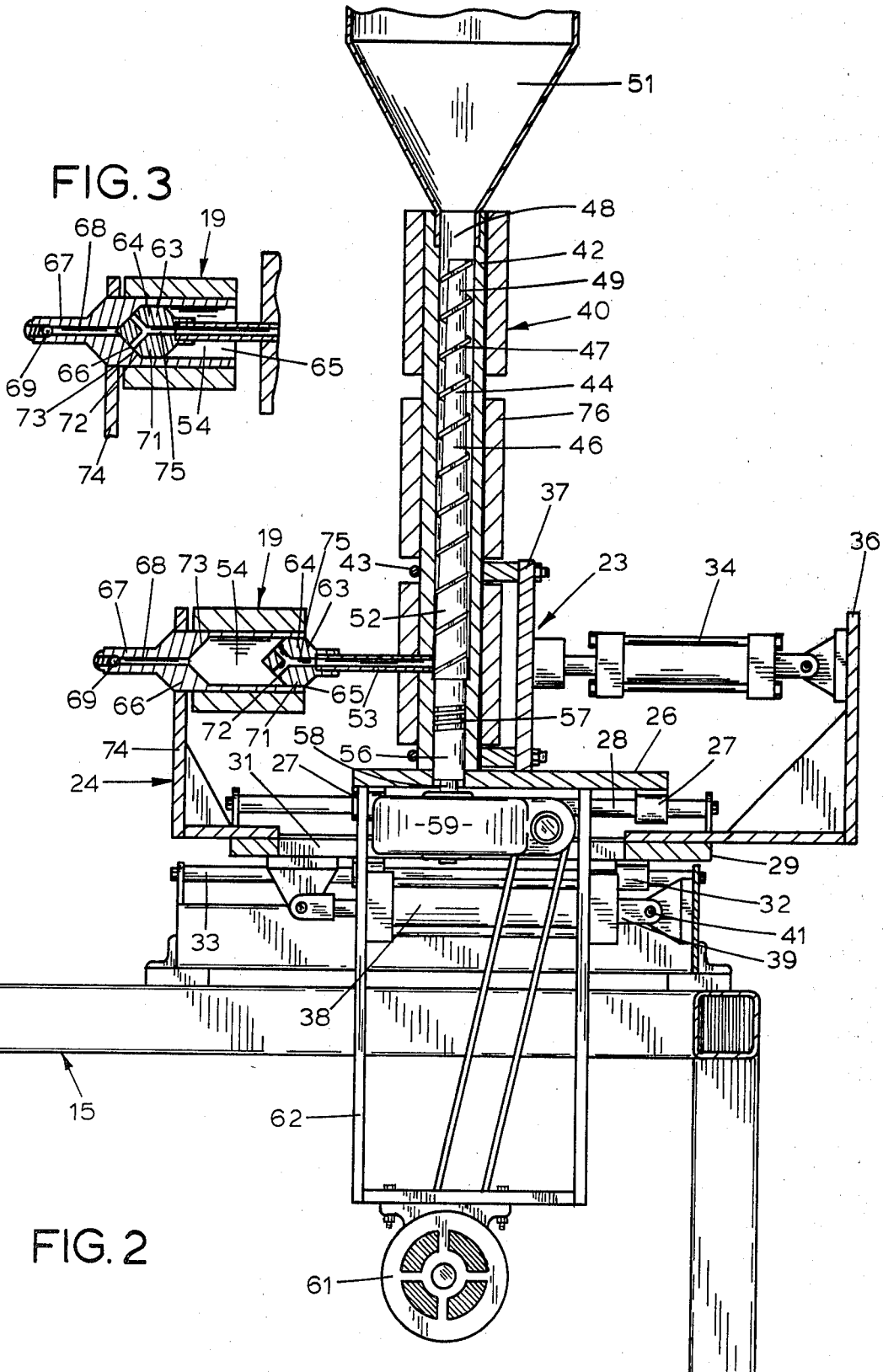

METHOD AND APPARATUS FOR MOLD INJECTION

SUMMARY OF THE INVENTION

The method and apparatus of this invention for injecting an injection material into a mold is simple, economic and efficient to mold in succession articles requiring varying amounts of an injection material. The injection material is continuously advanced by the upright feed screw of the extruder in a single direction and fed in incremental amounts, dependent upon screw rotational time periods, into a material metering chamber for the nozzle unit. The laterally extended extruder outlet also functions as a material inlet for the material chamber when the chamber is being loaded. When the chamber has been filled with a predetermined volume of material, the extruder is moved as a unit relative to the injection nozzle so that all material in the chamber is forced under pressure therefrom and into a mold during an injection operation. By virtue of the movable support of the extruder and nozzle unit for relative linear horizontal movement during the chamber loading and discharging operations, the material is moved in a single direction and in incremental amounts into and from the nozzle unit. As a result, the residence time of the material from its introduction into the extruder until the injection thereof into a mold is substantially constant for all material being injected so as to maintain substantially uniform the texture and density of the resultant formed articles. Importantly, all of the material is expelled from the material chamber of the injection nozzle unit so as to eliminate residual material in transfer passages, check valve assemblies and chamber portions. By virtue of the lateral extension of the extruder outlet at the lower end of the feed screw, the injection material therein, when the screw is inoperative, acts as a check valve to close the outlet against material passage therethrough, during an injection operation. Since the closed extruder outlet functions as a piston to completely empty the material chamber for a mold injection, the injection formed articles are uniformly constant in texture and appearance.

BACKGROUND OF THE INVENTION

Mold injection machines now in common use and as shown in U.S. Pat. No. 3,600,755 generally include a reciprocating feed screw for supplying a shot or charge of an injection material to a metering unit for injection into a mold. In these machines, the material is usually loaded into a metering chamber when the screw is rotated and then moved from such chamber into a discharge or accumulating chamber, by axial displacement of the screw, for injection into a mold. These machines are not only relatively bulky and expensive but are limited in operation to a set charge of material so as to produce similar articles in volume. In other words, they are incapable of varying the material charge to inject varying volumes of material into successive molds to produce articles of varying shapes and sizes. Additionally these machines, even in production runs, require excessive set up time and equipment. A further disadvantage results in the residence time of the material in the machine. Thus, when material is not continuously moved in a single direction, the injected material includes portions of varying residence times within the machine so as to impair the quality and/or the appearance of the finished article.

In U.S. Pat. No. 3,723,037, a vertical screw is supported for rotatable and vertical axial movements in a metering housing. Rotation of the screw feeds material from the hopper into a metering housing concurrently with moving the screw upwardly. The nonrotated screw is then axially moved to force the material from the housing into a transfer cylinder from which only a part of the transferred material is injected into a mold.

The feed screw of the injection machine shown in U.S. Pat. No. 3,020,591 is rotatably supported in a cylinder of an injection piston. Along with being rotatable, the feed screw is also axially movable. The end of the cylinder adjacent the free end of the feed screw forms a storage chamber the volume of which may be varied by varying the axial movement of the feed screw relative to the cylinder.

The injection machine in U.S. Pat. No. 3,327,354 has an injection portion or head that includes a rotatable feed screw and an injection nozzle that are movable as a unit relative to a carousel mounted mold. The feed screw extends horizontally and is held against axial movement relative to the injection nozzle. To fill a mold, the injection head is moved as a unit toward the mold to operatively engage the nozzle with the mold. The screw is then rotated to directly move injection material through the nozzle and into the mold, after which the screw is stopped or idled. The injection head is then retracted from the mold to permit another mold being moved into a mold filling position.

DESCRIPTION OF THE DRAWINGS

FIG. 1 is a rear perspective view of the mold injection apparatus of this invention;

FIG. 2 is an enlarged detailed sectional view taken substantially along the line 2—2 in FIG. 1 showing the extruder mechanism carriage units and the drive systems therefor;

FIG. 3 is a detailed sectional view showing the injection nozzle and extruder material outlet in changed positions relative to their positions in FIG. 2;

DETAILED DESCRIPTION OF THE INVENTION

Figure 4:
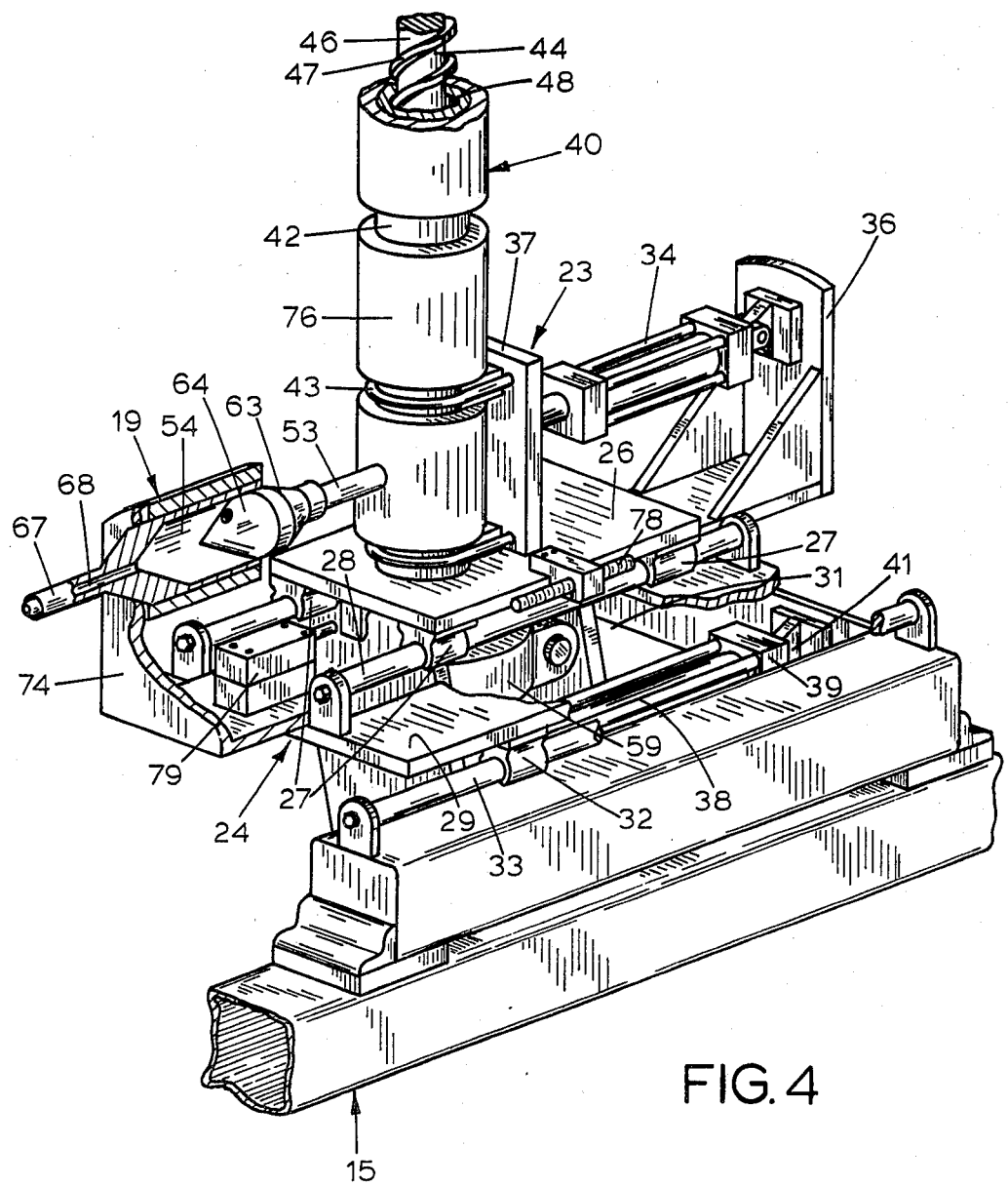
FIG. 4 is a detailed perspective view showing the support on the main frame of the apparatus of a pair of carriage units that carry the injection nozzle unit and extruder.

With reference to the drawings, the molding apparatus of this invention is shown in FIG. 1 as including an elongated main frame 15 having a carousel or turntable unit 16 rotatably mounted adjacent one end 17 for rotation about a vertical axis. The frame end 17 will hereinafter be referred to as the forward end of the main frame. The carousel unit 16 carries a plurality of mold forms 18 in a circumferentially spaced relation for successive location in an injection position relative to an injection nozzle unit 19. The injection nozzle unit 19 is movably supported adjacent the rear end 22 of the main frame 15 for reciprocal horizontal movement longitudinally of the frame toward and away from the carousel unit 16, which is operated in a well-known manner by an indexing mechanism (not shown) to selectively index a mold 18 to an injection position for operative engagement with the injection nozzle unit 19. The injection nozzle unit 19 is mounted on a main or lower carriage 24 which is movably mounted on the frame 15 for movement longitudinally thereof.

An upper or ancillary carriage 23 (FIGS. 1 and 4) that is carried on the main carriage 24 for movement longitudinally of the frame 15 has a flat plate member 26 of a generally square shape in plan view provided with transversely spaced pairs of depending bearings 27 slidably mounted on associated guide rods 28 extended longitudinally of the main frame 15 and mounted on the main carriage 24. The main carriage has a flat plate member 29 of a generally rectangular shape in plan view formed with an enlarged central opening 31 and provided with pairs of transversely spaced depending bearings 32 slidably supported on associated guide rods 33 mounted on and extended longitudinally of the frame 15.

It is seen, therefore, that the ancillary carriage 23 is movable longitudinally of the main frame 15 relative to the main carriage 24 and to the main frame 15, and that the main carriage 24 is movable longitudinally relative to only the main frame 15. The ancillary carriage 23 is moved by a single acting hydraulic cylinder 34 interconnected with and extended between a rear upright mounting plate 36, secured to and positioned rearwardly of the main carriage 24, and a front upright mounting plate 37 secured to the top plate member 26 of the ancillary carriage 23. The main carriage 24 is moved by a double acting hydraulic cylinder 38 having a rear end 39 pivotally connected at 41 to the main frame 15 and a forward end pivotally connected to a forward one of the depending bearings 32 on the main carriage 24.

Projected upwardly from the top plate member 26 of the ancillary carriage 23 is an extruder mechanism 40 that includes a cylindrical casing or housing 42, the lower end portion of which is secured to the member 26 and is rigidly clamped to the front mounting plate 37 by clamping members 43. An upright feed screw 44 (FIG. 2) rotatably supported within the housing 42 has a uniformly tapered shaft 46 with the small diameter end thereof uppermost within the housing 42. The screw flighting 47 is of a constant pitch and of a constant diameter which is only slightly less than the diameter of the housing bore 48. The upper section 49 of the feed screw 44 constitutes a feed section for receiving injection material from a hopper 51 at the upper end of the housing 42. Material from the feed section 49 is progressively compressed and transferred to the lower or metering section 52 of the feed screw from where it is forced or discharged through a cylindrical outlet tube 53 projected laterally outwardly of the housing 42 from the lower terminal end of the screw flighting 47.

The lower or large end of the tapered shaft 46 terminates in a straight cylindrical portion 56 that has bearing support within the bore 48 of the housing 42. A series of annular grooves 57 in the bearing portion 56 cooperate with any injection material collected therein to provide an adequate seal against material passing outwardly from the bore end of the housing 42. The shaft portion 56 (FIG. 2) is connected to the power take-off shaft 58 of a gear unit 59 that is in a driven relation with an electric motor 61. The motor 61 is mounted on a supporting frame 62 suspended from the top plate member 26 of the ancillary carriage 23 and projected downwardly within the confines of the main frame 15 through the central opening 31 of the top plate member 29 of the main carriage 24. The motor is thus movable as a unit with the extruder mechanism 40 and ancillary carriage 23.

It is seen, therefore, that the feed screw 44 is without axial movement relative to the housing 42. As a result, residence time of injection material within the housing is substantially uniform by virtue of its continuous unidirectional travel along the screw from the feed section 49 and over the metering section 52 for discharge or extrusion from the tubular outlet 53 into a material metering cylindrical chamber 54 of the injection nozzle unit 19 (FIG. 2).

The tubular outlet 53 for the extruder mechanism forms part of a hollow piston assembly 63 that is comprised of the tubular outlet 53 and a piston member 64 that coacts with the cylindrical metering chamber 54 to form therewith a piston and cylinder assembly wherein the piston head 64 is receivable within an open end 65 of the material chamber 54. The opposite or closed end 66 of the chamber 54 terminates in a nozzle member 67 having a central bore 68 open at one end to the material chamber 54 and provided at its opposite end with a usual one-way check valve, indicated at 69, which on being opened permits material to be injected from the passage 68 into a mold 18 on the carousel 16.

The piston head 64 has a cylindrical center section 71 slidably engageable with the inner peripheral surface of the material chamber 54 and an inner end section 72 of a conical shape adapted for mating engagement with a conically formed surface 73 at the closed end 66 of the chamber 54. In this respect, it is to be noted that the nozzle passage 68 terminates in the apex of the surface 73. The tubular outlet 53 of the extruder mechanism 40 is in communication with an axial bore 75 in the piston head 64 that terminates in a plurality of angular branches that have terminal ends in the conical surface of the piston head section 72. Material from the outlet 53 is thus distributed over the cross-sectional area of the chamber 54 to facilitate the chamber being compactly filled during the filling or loading thereof with an injection shot of material. It is further seen that on movement of the piston head 64, within the metering chamber 54 to a position wherein the piston end section 72 is in nested engagement with the conical surface 73 that the chamber will be emptied of all material so that after an injection shot the only material remaining in the injection nozzle unit 19 is within the passage 68.

The nozzle unit 19 (FIGS. 2 and 4) is carried on an upright mounting plate 74 carried at the forward end of the main carriage 24. Thus, on relative movement of the carriages 23 and 24, the injection nozzle 19 and piston assembly 63 are in turn relatively movable to vary the volume of the material chamber 54 from a maximum volume wherein the piston assembly is adjacent the open end 65 of the chamber 54 (FIG. 2) to a minimum or zero volume wherein the piston head 64 is in nested engagement with the chamber surface 73, as shown in FIG. 3.

Figure 5:
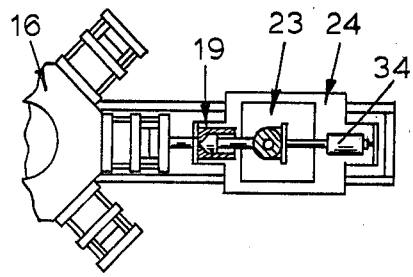
FIG. 5 diagrammatically illustrates the relative positions of the extruder mechanism and injection nozzle on completion of a molding operation.
Figure 6:
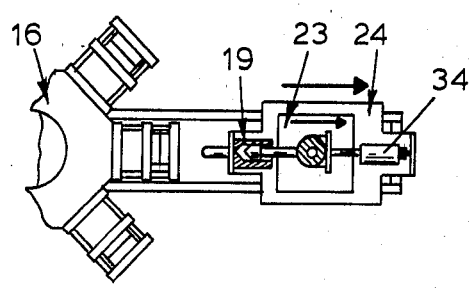
FIG. 6 is illustrated similarly to FIG. 5 and shows the extruder mechanism and injection nozzle unit retracted from the injected mold and the extruder mechanism in a retracted position relative to the injection nozzle unit.

In the operation of the apparatus, let it be assumed that an injection operation has been completed and that the nozzle unit 19 and piston assembly 63 are in their relative positions shown in FIGS. 3 and 5. The corresponding relative positions of a mold 18 and carriages 23 and 24 are shown diagrammatically in FIG. 5 wherein the actuating cylinder 34 for the carriage 23 and cylinder 38 for the carriage 24 are in their fully extended positions. To provide for the injection of material into a next successive mold 18, the cylinder 38 for the main carriage 24 is fully retracted to move the nozzle unit 19 away from the carousel unit 16 so that a next mold 18 can be moved into position as shown in FIG. 7.

Figure 7:
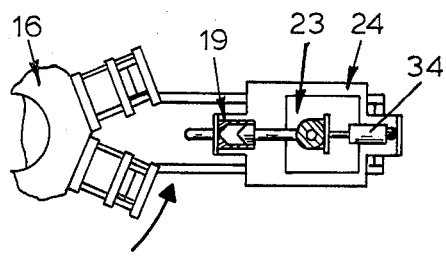
FIG. 7 is illustrated similarly to FIG. 6 and shows a next successive mold being moved into an injection receiving position and the extruder mechanism in its maximum retracted position relative to the injection nozzle unit.

Concurrently with movement of the carriage 24 in a direction away from the carousel unit 16, from its position in FIG. 5, to the position therefor in FIG. 7, the motor 61 is operated to drive the feed screw 44, and the actuating cylinder 34 for the carriage 23 is made idle. Operation of the feed screw 44 moves material through the piston assembly 63 and into the chamber 54. Since this material is under the pressure imposed thereon by the feed screw, such pressure reacts against the piston head 64 to move the extruder mechanism 40 and carriage 23 as a unit, relative to the carriage 24. This relative movement takes place against the idle cylinder 34 to retract the same. The outward movement of the piston assembly 63 with respect to the chamber 54 continues for so long as the feed screw 44 remains in operation. By varying the period of screw operation, therefore, the outward movement of the piston assembly 53 is correspondingly varied to in turn vary the volume of material that is being supplied to the chamber 54 from the extruder mechanism 40. With the motor 61 stopped and the cylinder 38 for the main carriage 24 retracted to permit free rotational movement of the carousel unit 16, the parts of the apparatus are in their relative positions shown in FIG. 7.

Figure 8:
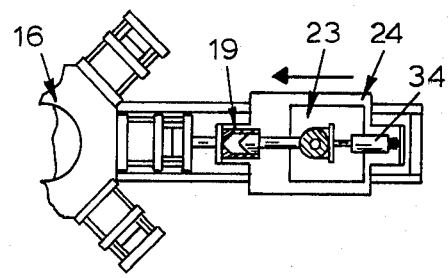
FIG. 8 shows a next successive mold in an injection receiving position, with the nozzle unit in operative engagement therewith and the extruder mechanism in its maximum retracted position prior to the commencement of a mold injection operation.

Cylinder 38 is then operated to move the carriages 23 and 24 together toward the carousel unit 16 for operative engagement of the nozzle unit 19 with the next mold 18 to their relative positions shown in FIG. 8. When thus positioned, the carriage 23 is moved by its cylinder 34 to operate the piston assembly 63 relative to the injection nozzle 19 to inject all material in the chamber 54 through the passage 68 and into a mold 18.

The injection material in a particulate form is supplied to the feed screw 44 from the hopper 51 mounted at the upper end of the tubular housing 42 and continuously advanced in a single direction from the hopper 51 and through the housing for discharge from the tubular outlet 53 and piston head 64 into the material chamber 54. To obtain a uniform high temperature of the material being injected, quality control heating elements 76 are mounted about the housing 42 over the axial length thereof, and about the material chamber 54 of the nozzle unit 19 so that the material is in a plastic state on discharge therefrom. Additionally, during the advance of the material through the extruder mechanism 40, the material is progressively compressed and subjected to frictional heat.

It is seen, therefore, that the extruder mechanism 40 forms a confined path of travel for the injection material from the hopper inlet 51 to the discharge outlet 53, which is moved in opposite directions relative to the injection nozzle 19 to provide for the loading of material into and emptying of material from the chamber 54 in an injection operation. The action of the hollow piston assembly 63 to function as a material inlet relative to the chamber 54 during a loading operation, and as a closed piston for emptying the chamber during an injection operation is due to the frictional locking of the material in the laterally extended piston assembly 63 and about the upright idle feed screw 44. This friction lock serves as a plug to block the material against any reversed flow into the extruder mechanism 40 as the piston head 64 is advanced within the chamber 54. The material is thus moved at all times in one direction during its travel through the extruder mechanism 40 and injection nozzle 19.

The volume of material admitted into the material chamber 54 for discharge into a mold 18 can be maintained constant or automatically varied as desired by the use of well-known computerized programming coacting with transducers or the like (not shown) mounted on the apparatus. By way of example, the means illustrated in FIGS. 1 and 4 comprises switch devices that may be manually or mechanically adjusted to meter the volume of material supplied to the chamber 54. A normally closed limit switch 77 mounted on the main carriage 24 is closed by a manually adjustable actuator 78 mounted on the ancillary carriage 23. A normal open control switch 79 for the feed screw motor 61 is mounted on the main carriage 24 for actuation by the carriage 23.

Figure 10:
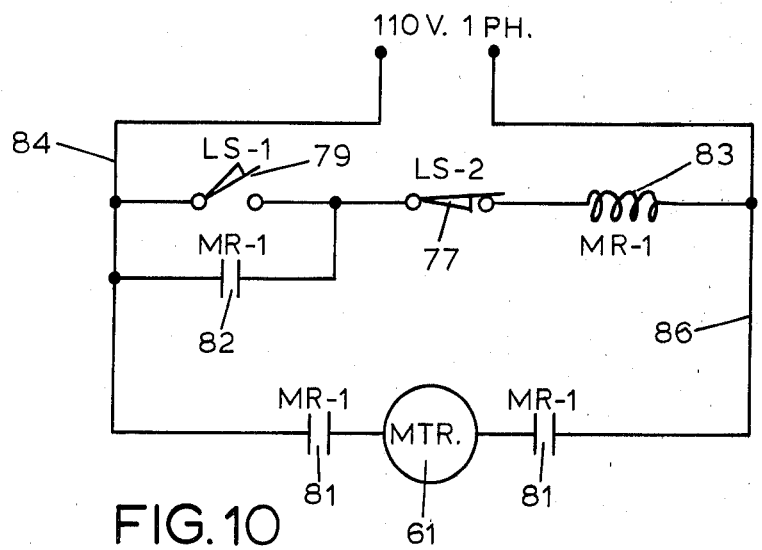
FIG. 10 is a schemmatic showing of an electrical circuit for the drive motor of the extruder mechanism.

As shown in FIG. 10, the circuit for the motor 61 has a relay that includes the normally open motor contacts 81, a normally open holding switch 82, and an actuating coil 83. On closing of the switch 79, at the termination of an injection shot into a mold, the coil 83 is energized through a circuit that from the lead line 84, includes switch 79, coil 83, normally closed limit switch 77 and motor 61, and lead line 86. Energization of coil 83 and motor operation thus take place concurrently on closing of the switch 79 to energize such circuit, after which switch 79 opens so that the circuit continues to be energized through hold down switch 82. Thus, on movement of the carriage 23 out of contact with the switch 79, the circuit for the coil 83 and motor 61 continues to remain closed through the hold down switch. On engagement of the actuator 78, with the normally closed limit switch 77, the circuits for the coil 83 and motor 61 are opened to stop the feed screw 44 from feeding any further material into the chamber 54, concurrently with the return of the hold down switch 82 to its normally open position. The volume of material admitted into the chamber 54, therefore, is directly proportional to the time period of feed screw operation. Thus, by adjusting the actuator 78, manually or by electrical means, to limit the movement of the extruder mechanism 40 away from the injection nozzle unit 19, such time period can be varied to provide for the supply of predetermined volumes of injection material into the chamber 54, corresponding to the size shots required for mold injections.

Figure 9:
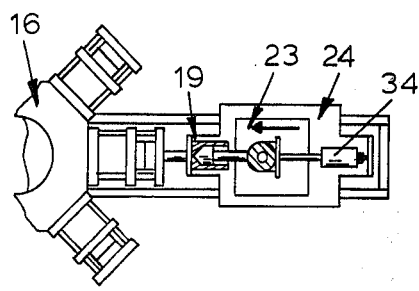
FIG. 9 is illustrated similarly to FIG. 8 and shows the parts in their relative positions of FIG. 5, wherein the extruder mechanism has been moved relative to the injection nozzle unit to inject material into a mold.

With the metering chamber 54 charged with a shot of predetermined volume, the cylinder 38 for the carriage 24 is extended to move the nozzle member 67 into operative engagement with a mold form 18. When thus operatively engaged, the cylinder 34 of the carriage 23 is extended to move the extruding mechanism 40 and cylinder assembly 63, as a unit, relative to the injection nozzle unit 19 from their positions shown in FIG. 8 to their position shown in FIG. 9. This relative movement continues until the metering chamber 54 is completely evacuated and the central switch 79 actuated. The above described cycle of operations is then repeated.

It is to be understood that mold forms 18 requiring varying amounts of injection material may be handled successively by virtue of the wide volume attainable through the coaction of the metering chamber 54 with the piston assembly 53. It is further apparent that the injection nozzle unit 19 and piston assembly 53 may be interchangeable to additionally vary the range of shot volumes that can be obtained.

With the injection material being uniformly heated during its continuous advance in a single direction through the apparatus, the residence time and temperature of the injection material are maintained substantially constant throughout the extrusion and injection operations to provide for quality injection formed products.

Although the invention has been described with respect to a preferred embodiment thereof, it is to be understood that it is not so limited since changes and modifications can be made therein which are within the full intended scope of this invention as defined by the appended claims.

I claim:
1. The method of injecting an injection material into a mold comprising the steps of:
 (a) introducing particulate injection material into one end of a confined path having an outlet projected laterally from the other end thereof,
 (b) continuously advancing the material in said confined path toward and through said outlet for discharge into an injection nozzle unit,
 (c) uniformly heating the material over the course of said path,
 (d) moving the confined path in one direction relative to the injection nozzle unit to move the outlet into the nozzle unit for injecting material therefrom into a mold, and then
 (e) moving the confined path a predetermined distance in an opposite direction relative to the injection nozzle unit by the discharge of the continuously advancing material from said outlet into the injection nozzle unit.

2. The method of claim 1, including:
 (a) blocking the material in said path against movement toward the one end thereof during the injection of the material into a mold.

3. The method of claim 1, including:
 (a) varying the movement of the confined path in said opposite direction, relative to the injection nozzle unit, to vary the amount of injection material being discharge into said injection nozzle unit for injection into a mold.

* * * * *